(12) United States Patent
Jelley et al.

(10) Patent No.: US 7,209,172 B2
(45) Date of Patent: Apr. 24, 2007

(54) MULTICOLOR LIGHT SENSING PIXEL STRUCTURE

(75) Inventors: Kevin W. Jelley, LaGrange, IL (US); King F. Lee, Schaumburg, IL (US)

(73) Assignee: Motorola, Inc., Schaumburg, IL (US)

(*) Notice: Subject to any disclaimer, the term of this patent is extended or adjusted under 35 U.S.C. 154(b) by 914 days.

(21) Appl. No.: 10/387,746

(22) Filed: Mar. 13, 2003

(65) Prior Publication Data
US 2004/0179119 A1  Sep. 16, 2004

(51) Int. Cl.
*H04N 5/335* (2006.01)
*H01L 31/00* (2006.01)

(52) U.S. Cl. .................. 348/308; 348/281; 348/302; 257/440

(58) Field of Classification Search ............. 348/308, 348/281, 302, 372; 250/208.1; 341/155; 257/291, 440
See application file for complete search history.

(56) References Cited

U.S. PATENT DOCUMENTS

| | | | |
|---|---|---|---|
| 5,461,425 A | 10/1995 | Fowler et al. | |
| 5,965,875 A | 10/1999 | Merrill | |
| 6,133,954 A * | 10/2000 | Jie et al. | 348/308 |
| 6,310,571 B1 * | 10/2001 | Yang et al. | 341/155 |
| 6,377,303 B2 * | 4/2002 | O'Connor | 348/308 |
| 6,380,880 B1 * | 4/2002 | Bidermann | 341/155 |
| 6,665,010 B1 * | 12/2003 | Morris et al. | 348/297 |
| 6,963,060 B2 * | 11/2005 | Knee et al. | 250/208.1 |

OTHER PUBLICATIONS

Yang, D.; Fowler, B.; Gamal, A.; "A 128+128 Pixel CMOS Area Image Sensor with Multiplexed Pixel Level A/D Conversion" IEEE 1996, Custom Integrated Circuits Conference.

* cited by examiner

*Primary Examiner*—Lin Ye

(57) ABSTRACT

A photodiode structure (300) includes a first plurality of co-located light band detectors that generate analog detector signals, a first multiplexing circuit (440) coupled to the first plurality of analog detector signals, which sequentially generates each of the first plurality of analog detector signals at a first multiplexed output (444), a second multiplexing circuit (445) coupled to a first plurality of reference signals, which sequentially generates at a second multiplexed output (449) each of the first plurality of reference signals in synchronism with the first multiplexed output (444); and a single digital pixel sensor circuit (315) having inputs coupled to the first and second multiplexed outputs, which sequentially generates a series of digital outputs based on the first and second multiplexed outputs (444. 449).

13 Claims, 3 Drawing Sheets

MULTICOLOR LIGHT SENSING PIXEL STRUCTURE

This application is related to applications entitled "Digital Double Sampling in Time Integrating Pixel Sensors" U.S. Ser. No. 10/012,988 filed on Dec. 10, 2001, "Digital Pixel Image Sensor with Independent Color Channel Reference Signals" U.S. Ser. No. 10/124,381 filed on Apr. 17, 2002, and application entitled "Time Integrating Pixel Sensor" U.S. Ser. No. 10/102,947 filed on Dec. 10, 2001, assigned to the assignee of the instant application.

BACKGROUND OF THE INVENTION

CMOS based image sensors have become an active area of development because they, unlike CCD sensors, are made with process steps that are compatible with those used to make standard CMOS digital integrated circuits. An expectation has evolved that ultimately, CMOS based image sensors will be more cost effective than CCD based image sensors because they can be produced on one integrated circuit using economical CMOS based processes.

There are several characteristics of importance for image sensors. Among these are power consumption, fill factor, dynamic range, noise, and uniformity. Fill factor is the percentage of the resulting imaging device that is used for detecting light.

Several investigations of CMOS based image sensors have been conducted to improve some of these characteristics for monochrome or full color imaging devices. One of these is described in U.S. Pat. No. 5,461,425 to Fowler et al., in which the analog signal from each pixel in an array area is converted by digital circuitry at each pixel to serial bit streams. These serial data streams are analyzed by a central processing circuitry of the array by counting the bits of one state to obtain an approximation of the original analog value. This improvement helps noise and dynamic range by converting the small charges from the photodiode junction to digital information at each pixel. Another investigation is described in an article published in a record of the IEEE Custom Integrated Circuits Conference of 1996 entitled "A 128×128 Pixel CMOS Area Image Sensor with Multiplexed Pixel Level A/D Conversion" by Yang et al. that describes multiplexing monochrome pixels in groups of 4 to improve noise and dynamic range.

Investigations into those aspects of image sensor design that are unique to color imaging are also ongoing. One of these is described in U.S. Pat. No. 5,965,875 to Merrill, in which a triple-well structure is described that co-locates the sensors for three color bands (red, green, blue) essentially on top of each other. This directly affects the fill factor by reducing the area needed to capture light in different color bands compared to a conventional side by side arrangement for color imagers.

What is still needed is a comprehensive cost effective solution for a color imaging integrated circuit.

BRIEF DESCRIPTION OF THE DRAWINGS

The present invention is illustrated by way of example and not limitation in the accompanying figures, in which like references indicate similar elements, and in which.

Figure 1:
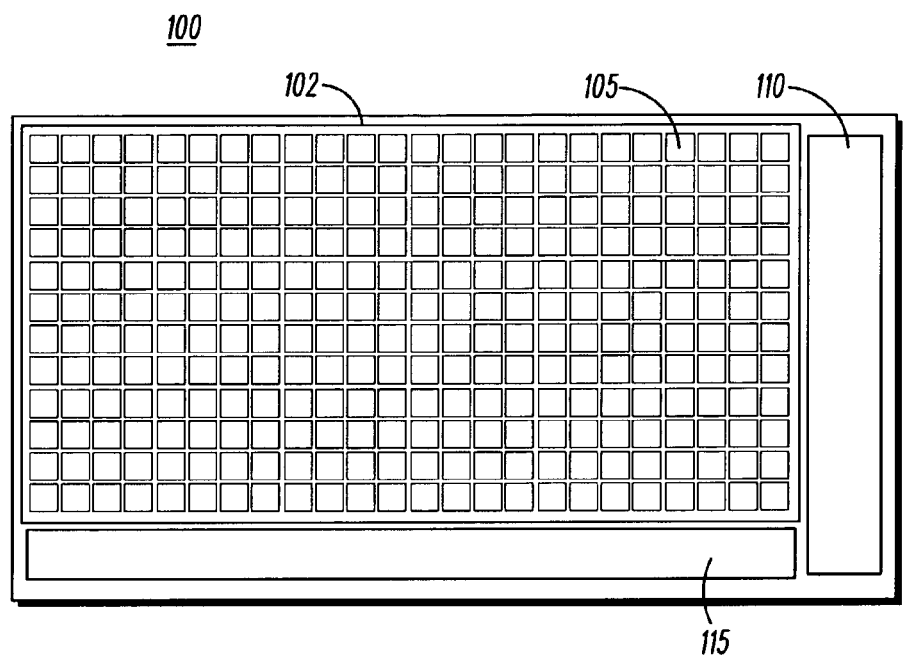
FIG. 1 is a plan view showing a prior art multicolor pixilated image sensor representative of many prior art imaging devices that are integrated on one substrate.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the particular image sensor technique in accordance with the present invention, it should be observed that the present invention resides primarily in combinations of apparatus components related to the image sensor technique. Accordingly, the apparatus components have been represented where appropriate by conventional symbols in the drawings, showing only those specific details that are pertinent to understanding the present invention so as not to obscure the disclosure with details that will be readily apparent to those of ordinary skill in the art having the benefit of the description herein.

Referring to FIG. 1, a plan view shows a prior art multicolor pixilated image sensor 100 representative of many prior art imaging devices that are integrated on one substrate. The image sensor 100 comprises a pixel array area 102 and control circuit areas 110, 115. The pixel array area 102 comprises a plurality of multicolor pixels 105 that are electrically coupled to the control circuits located in the control circuit areas 110, 115.

Figure 2:
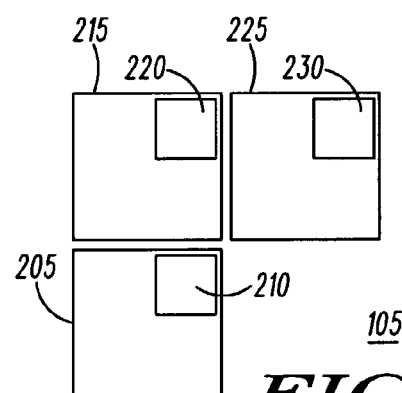
FIG. 2 is a plan view of one of the multicolor light sensing pixels of the prior art image sensor shown in FIG. 1.

Referring to FIG. 2, a plan view of one of the multicolor light sensing pixels 105 of the prior art image sensor 100 is shown. The multicolor pixel 105 comprises three monochrome photosensors 210, 220, 230, each of which is designed to detect light within a range of wavelengths, also called a band, that are identified as being associated with one of the visible colors blue, green and red. For example, the photosensor 210 is a blue photosensor, the photosensor 220 is a green photosensor, and the photosensor 230 is a red photosensor. Associated with each photosensor 210, 220, 230 is a digital pixel sensor (DPS) circuit 205, 215, 225 that performs a conversion of an analog electrical signal to a digital electrical signal, called the pixel output signal. The DPS circuits 205, 215, 225 are typically identical or very similar to each other. An example of such DPS circuits 205, 215, 225 is described in U.S. Pat. No. 5,461,425 issued to Fowler et al. on Oct. 24, 1995. The pixel output signal that is generated is coupled to the control circuits in the control circuit areas 110, 115 by column/row matrix addressing that may be of conventional or unique design. The control circuits then process all the pixel output signals to generate a frame image, in a manner that may be conventional or unique.

Figure 3:
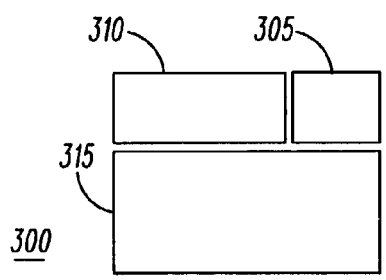
FIG. 3 is a plan view of a multicolor light sensing pixel structure, in accordance with the preferred embodiment of the present invention.

Referring to FIG. 3, a plan view of a multicolor light sensing pixel structure 300 is shown, in accordance with the preferred embodiment of the present invention. The multicolor light sensing pixel structure 300 comprises a photodiode structure 305, a multiplexing circuit section 310, and a digital pixel sensor circuit 315.

The photodiode structure 305 comprises a plurality of co-located light band detectors. In accordance with the preferred embodiment of the present invention, the plurality of co-located light band detectors are provided by a multi-well structure for detecting three light bands, as described in U.S. Pat. No. 5,965,875 issued to Richard Merrill on Oct. 12, 1999. In accordance with the present invention, "co-located light band detectors" means that the technology used for multicolor detection uses a sensing area (such as the area occupied by the photodiode structure 305 shown in FIG. 3) and generates a quantity of analog signals that is the same as the quantity of colors detected, wherein each color is sensed by an active portion of the sensing area that is substantially more than the fraction of the sensing area represented by the inverse of the quantity of multicolors. For example, in a tri-color photodiode structure according to the present invention, the active portion of each light band detector is substantially more than one-third of the sensing area. It will be appreciated that the present invention will provide the same benefits using co-located light band detectors other than that described in U.S. Pat. No. 5,965,875. It will be further appreciated that the present invention will provide very similar benefits when the number of colors is other than three; for example two or four.

Figure 4:
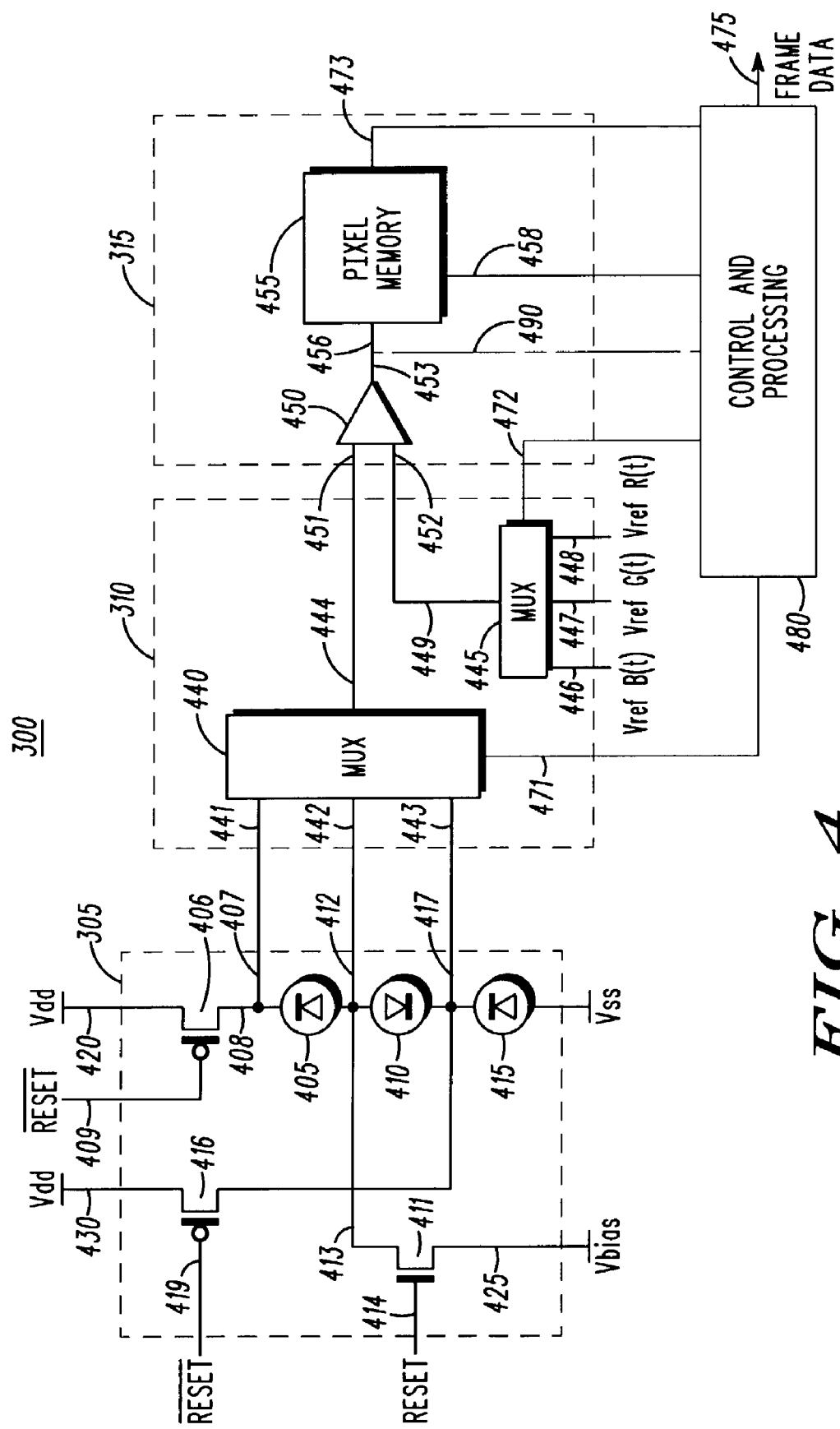
FIG. 4 is an electrical schematic and block diagram of the multicolor light sensing pixel structure, in accordance with the preferred embodiment of the present invention.

Referring to FIG. 4, an electrical schematic and block diagram of the multicolor light sensing pixel structure 300 is shown, in accordance with the preferred embodiment of the present invention. The photodiode structure 305 comprises three photodiodes; a blue photodiode 405, a green photodiode 410, and a red photodiode 415 and three photodiode reset transistors: a blue photodiode reset transistor 406, a green photodiode reset transistor 411, and a red photodiode reset transistor 416. The photodiodes 405, 410, 415 are substantially responsive to light that is within the color band that correspond to their respective names, and substantially non-responsive to light in other color bands. The three photodiodes 405, 410, 415 are coupled in series. A cathode of the blue photodiode 405 is coupled to a first color output 407 and to an output terminal 408 of the blue photodiode reset transistor 406. The anode of the blue photodiode 405 is coupled to an anode of a green photodiode 410, to a second color output 412, and to an output terminal 413 of the green reset transistor 411. The cathode of the green photodiode 410 is coupled to a cathode of a red photodiode 415, to a third color output 417, and to an output terminal 418 of the red reset transistor 416. A first fixed reference voltage, $V_{dd}$, is coupled to a supply terminal 420 of the blue reset transistors 406 and to a supply terminal 430 of the red reset transistor 416. The fixed reference voltage $V_{dd}$ is positive with reference to a second fixed reference voltage, $V_{SS}$, that is coupled to an anode of the red photodiode 415. A third reference voltage, $V_{bias}$, that has a value that is between the first and second fixed reference voltages is coupled to a supply terminal 425 of the green reset transistor 411. A reset signal, that is digital in nature, is coupled to a reset input 414 of the green reset transistor 411. The inverse of the reset signal is coupled to a reset input 409 of the blue reset transistor 406 and a reset input 419 of the red reset transistor 416.

When the reset signal is asserted (the voltage is a digital "high" voltage), the diodes are all reversed biased; the blue diode is biased with $V_{bias}-V_{dd}$ volts, the green diode is biased with $V_{bias}-V_{dd}$ volt, and the red diode is biased with $V_{SS}-V_{bias}$ volts. When the reset signal is unasserted, light energy causes current to flow into the respective anodes of the blue, green and red photodiodes 405, 410, 415 causing the voltage at the cathodes of the photodiodes 405, 410, 415 to decrease with reference to the voltage at the anodes (alternatively called the reverse bias voltage potential or the reverse voltage across the photodiode). The decrease of the reverse voltage across a particular photodiode 405, 410, 415 occurs at a rate largely determined by the intensity (power) of light within the color band of the light impinging upon the active portion of the sensing area of the corresponding photodiode 405, 410, 415, the sensitivity of the corresponding active region, and the junction capacitance of the corresponding photodiode 405, 410, 415—up to a point where the corresponding photodiode becomes forward biased. Thus the voltages at the color outputs 407, 412, 417 are analog electrical output signals, also called analog detector signals, that can be used to determine the energy of the light within each of the three light bands that is detected by the active portion of the each of the sensing areas of the photodiodes 405, 410, 415 after a reset command has been generated. The determination of the amount of energy detected by an active portion of one of the photodiodes 405, 410, 415 requires, in each instance, determining the reverse voltage from the difference of two signals. For the blue photodiode 405, the reverse voltage is determined by the difference of the first color output 407 and the second color output 412. For the green photodiode 410, the reverse voltage is determined by the difference of the third color output 417 and the second color output 412. For the red photodiode 415, the reverse voltage is determined by the difference of the third color output 417 and $V_{SS}$.

The photodiodes 405, 410, 415 may be fabricated in the multi-well structure for detecting three light bands as described in U.S. Pat. No. 5,965,875, or may be fabricated using another co-located light band detector technology.

A blue co-located light band detector comprises the blue photodiode 405 and the blue photodiode reset transistor 406. Analogous statements can be made for the other photodiodes 410, 415 and photodiode reset transistors 411, 416. The co-located light band detectors may thus be described as co-located light band detectors that generate analog detector signals that can be used to determine an amount of energy detected by each of the co-located light band detector since the photodiode structure has been reset by a reset command. It will be appreciated that the photodiode reset transistors 406, 411, 416 may be physically implemented within the area of the photodiode structure 305 shown in FIG. 3, but alternatively may be physically implemented within the area of the multiplexing circuit section 310 shown in FIG. 3.

Referring again to FIG. 4, the multiplexing circuit section 310 comprises a first multiplexer 440 and a second multiplexer 445, in accordance with the preferred embodiment of the present invention. The first multiplexer 440 has three analog inputs 441, 442, 443, one control input 471, and a first multiplexed output 444. The three analog inputs 441, 442, 443 are coupled, respectively, to the first, second and third color outputs 407, 412, 417 of the photodiode structure 305. The control input 471 is coupled to a control and processing circuit 480, which is physically located in areas analogous to the areas 110, 115 of the image sensor 100 described with reference to FIG. 1. The control and processing circuit 480 generates a two bit control signal coupled to the control input 471. The value of the two bit control signal selects one of the three analog detector signals coupled to the analog inputs 441, 442, 443 and generates at the first multiplexed output 444 the selected analog detector signal, without substantial change. The second multiplexer 445 has three analog inputs 446, 447, 448, one digital control input 472, and a second multiplexed output 449. The three analog inputs 446, 447, 448 are coupled, respectively, to time varying reference voltages, $V_{ref}B(T_S)$, $V_{ref}G(T_S)$, $V_{ref}R(T_S)$. The time varying reference voltages are identified as being functions of $T_S$, which are time intervals that are described below. The control and processing circuit 480 generates a two bit control signal coupled to the control input 472. The value of the two bit control signal selects one of the three reference voltages, $V_{ref}B(T_S)$, $V_{ref}G(T_S)$, $V_{ref}R(T_S)$, coupled to the analog inputs 446, 447, 448 and generates at the second multiplexed output 449 the selected reference voltage, without substantial change. The first and second multiplexers 440, 445 are circuits that may be of conventional or unique design. The control and processing circuit 480 can be implemented as an application specific circuit portion of the image sensor or a program controlled processing circuit, such as a microcontroller with program instructions stored in non-volatile memory and random access memory, or a combination thereof, with appropriate digital to analog conversion output circuits for generating the time varying reference voltages.

The digital pixel sensor circuit 315 comprises a comparator 450 and pixel memory 455. A first input 451 of the comparator 450 is coupled to the analog output 444 of the first multiplexer 440. A second input 452 of the comparator 450 is coupled to the analog output 449 of the second multiplexer 445. A signal is generated at an output 453 of the comparator 450 that has a binary value based on a comparison of the value of the first multiplexed output 444 to the second multiplexed output 449. For example, the signal at the output 453 assumes a first binary state when the value of the first input 451 is greater than or equal to the value of the second input 452, and assumes a second binary state otherwise. The comparator 450 is a circuit that may be of conventional or unique design. The output 453 of the comparator 450 is coupled to a data input 456 of a pixel memory 455, which also has a control input 458 coupled to the control and processing circuit 480. A pixel data output 473 of the pixel memory 455 is coupled to the control and processing circuit 480.

In an alternative embodiment of the present invention, the single digital pixel sensor circuit does not include the pixel memory 455; the output 453 of the comparator 450 is instead coupled to the control and processing circuit 480 in which there is located an array pixel memory.

In accordance with both the preferred and alternative embodiments, the control and processing circuit 480 generate the two bit control signals coupled to the first and second multiplexers 440, 445 such that each of the analog detector signals of the photodiode structure 305 is sequentially selected at the first multiplexed while a corresponding reference voltage is synchronously and sequentially selected at the second multiplexed output, resulting in a signal at the output 453 of the comparator 450 that is a sequence of binary states. The sequence comprises a plurality of sub-intervals during each time interval, $T_S$, that occurs in a cycle that consists of a plurality of N time intervals, $T_S$, S=1 to N, that occur between each two subsequent reset commands. During each time interval, $T_S$, the analog detector signal at each of the color outputs 407, 412, 417 is selected by the first multiplexer 440 at least once. In accordance with the preferred embodiment, each analog detector signal is selected only once during each time interval and is selected for an equivalent sub-interval duration, but alternative embodiments may select one or more of the signals more than once. Selection more than once could be appropriate to compensate for differing color band detector sensitivities if equivalent sub-interval durations are used, or, in another example, differing sub-interval durations could be used to compensate for differing color band sensitivities. Thus, the first and second multiplexed outputs 444, 449 are comprise two sequences; one being values related to the analog signals of the color outputs 407, 412, 417 that are interleaved with reference to each other, and the other being reference voltages, $V_{ref}B(T_S)$, $V_{ref}G(T_S)$, $V_{ref}R(T_S)$, that are interleaved with reference to each other; and the comparator output 453 is a sequence of interleaved binary values determined by the comparison of the two sequences.

The control and processing circuit 480 digitally generates the reference voltages, $V_{ref}B(T_S)$, $V_{ref}G(T_S)$, $V_{ref}R(T_S)$, such that they are time varying. However, in accordance with the preferred embodiment of the present invention, they are held constant during each interval $T_S$, in which the analog detector signals are each selected. Hence, the reference voltages have been notated as $V_{ref}X(T_S)$, wherein S identifies the ordinal number of the time interval after the most recent reset command and X is a color identifier. Preferably, the time intervals are equivalent and each of the plurality of analog output signals are each selected once per time interval $T_S$, but other duration relationships could be used in alternative embodiments in accordance with the present invention.

It will be appreciated that because the rate of decrease of the reverse voltage across each photodiode 405, 410, 415 is related to the intensity of light within the band detected by the photodiode, the intensity can be determined by estimating the rate of decrease of the reverse voltage. In accordance with the preferred embodiment of the present invention, the time intervals are short enough that the intensity can be considered constant during each time interval, and the rate of decrease can thus be related to determining a slope of a plot of the reverse voltage versus time that is essentially linear. The slope is determined by using the comparator 450 to make a comparison that is effectively a comparison of the value of the reverse voltage across each photodiode to a corresponding test voltage value that is held constant for a significant portion of a cycle. Because the reverse voltage across a photodiode can be determined by subtracting an estimate of the voltage at the anode of the photodiode from the current value of the analog detector signal at the cathode of the photodiode, comparison of the reverse voltage across a photodiode to a test voltage can be accomplished by comparing the analog detector signal at the cathode to a sum of the test voltage plus an estimate of the voltage at the anode. As an example, the reverse voltage of the blue photodiode matches a test voltage $V_{T1}$ when $V_{407}(T_S)$—estimated $V_{412}(T_S)=V_{T1}$. The notation $V_{4xx}$ refers to the voltage on the respective color output 4XX. This is equivalent to $V_{407}(T_S)$=estimated $V_{412}(T_S)+V_{T1}$. Accordingly, during a cycle between two reset commands, the control and processing circuit 480 generates $V_{ref}B(T_S)$ to be the test voltage $V_{T1}$ plus a best estimate of $V_{412}(T_S)$. The best estimate of $V_{412}(T_S)$ used by the control and processing circuit 480 is preferably the value of $V_{412}$ determined from the most recently completed cycle of time intervals, but it could be alternatively derived by a long term averaging or other estimation techniques. An analogous situation exists for the green photodiode, for which $V_{ref}G(T_S)$ is set to be a sum of a test voltage $V_{T2}$ plus a best estimate of $V_{417}(T_S)$. However, for the red photodiode, $V_{ref}R(T_S)$ is set to be a sum of a test voltage $V_{T3}$ plus $V_{SS}$. The reference voltages, $V_{ref}B(T_S)$, $V_{ref}G(T_S)$, $V_{ref}R(T_S)$, can also be uniquely further adjusted from cycle to cycle to achieve a white balance under differing ambient lighting conditions, which can relieve the control and processing circuit 480 of substantial computations, by adding in appropriate white balance voltage offsets, $V_{BWB}$, $V_{GWB}$, and $V_{RWB}$. Stated differently, the control and processing circuit 480 generates at least one of the plurality of reference signals during each time interval with a value that is an additive combination of at least one of 1) an estimation of a current value of another one of the first plurality of analog detector signals, 2) a test value, and 3) a white balance adjustment value.

In accordance with the preferred embodiment of the present invention, the single pixel memory 455 is controlled by the control and processing circuit 480 to store the sequential binary values of the output 453 of the comparator 450 as sets of digital values once for each cycle. The sets of digital output values are transferred from the output 473 of the pixel memory 455 to the control and processing circuit 480 upon a command generated by the control and processing circuit 480 just before each reset command is generated. The control and processing circuit 480 uses the sets of digital values to quantify the amount of energy detected by each co-located light band detector.

Figure 5:
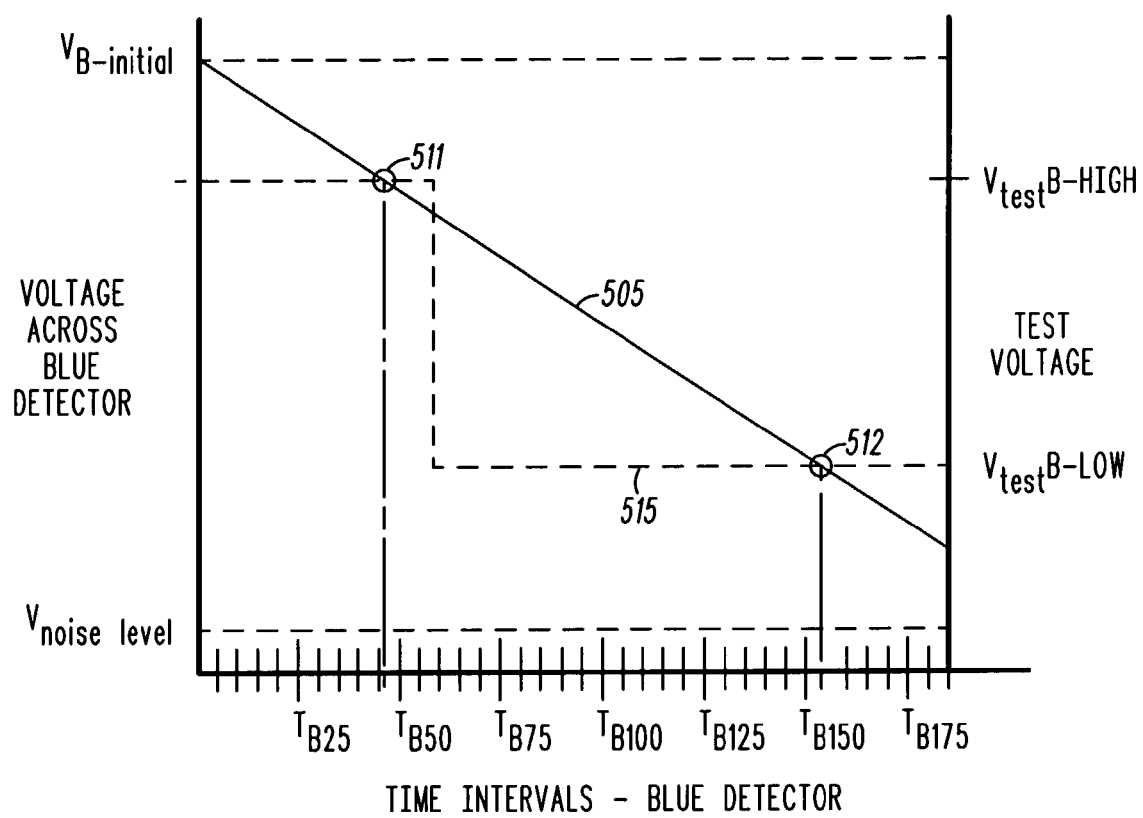
FIG. 5 is a graph of voltage versus time intervals, in accordance with an example of how the multicolor light sensing pixel structure of FIG. 4 can use interleaved binary values to quantify the amount of energy detected by each co-located light band detector of the multicolor light sensing pixel structure.

Referring to FIG. 5, a graph of voltage versus time intervals is shown, in accordance with an example of how the control and processing circuit 480 can use the interleaved binary values generated at the output 453 of the comparator 450, and from them quantify the amount of energy detected by each co-located light band detector. In this technique, the test voltage portions of the reference voltages $V_{ref}B(T_{Bs})$, $V_{ref}G(T_{Gs})$, $V_{ref}R(T_{Rs})$ are set to a high voltage during a first portion of the duration between two reset commands and then changed to a substantially lower voltage after a predetermined total number of time intervals that is less than the total number of time intervals between reset commands. The graph of FIG. 5 shows an example of the operation of this technique as it pertains to one of the three co-located light band detectors—a blue light detector. Marked on the right vertical axis are the low and high values of the test voltages used for determining the energy detected by the blue co-located light detector, $V_{test}$ B-LOW and $V_{test}$B-HIGH. As shown by plot 515, the reference voltage, $V_{test}$, is at $V_{test}$B-HIGH for time intervals $T_1$ through $T_{58}$ and is changed to $V_{test}$ B-LOW for time intervals $T_{59}$ through $T_{185}$. Although the time intervals are shown in this example as being uniform, they may in some embodiments be non-uniform, such as having durations that increase approximately logarithmically. The durations of the time intervals must therefore be pre-determined (but not necessarily uniform), so that an identified time interval or count of time intervals can be related to a total duration from the last reset command. The left vertical axis in FIG. 5 is used to indicate the voltage of the analog detector signal for the blue co-located light detector (hereafter called the blue output signal) during the time between two reset commands. An example of the variation of the blue output signal is shown as plot 505. The plot 505 starts at a voltage labeled $V_{B\text{-}initial}$, which is approximately $V_{dd}-V_{bias}$ (described with reference to FIG. 4). The plot 505 shows the approximate variation of the blue output signal for a condition in which the intensity of the blue light upon the blue co-located light detector is constant during the time between reset commands. When the light is of the intensity that generates plot 505, the control and processing circuit 480 will, for example, determine that the number of time intervals (a first number of intervals) after which the blue output voltage matches $V_{test}$ B-HIGH, at point 511, is 47, and determines that the number of time intervals (a second number of intervals) after which the blue output voltage matches $V_{test}$ B-LOW, at point 512, is 155.

From these two measurements, the control and processing circuit 480 can make a more accurate estimate of the blue light intensity, which is related to the slope of the plot 505, than from just one measurement. When the reference voltage, $V_{test}$, is changed from the high value to the low value at the same time after every reset, then for many values of light intensity, the state of the binary signal of the output 453 of the comparator 450 will change from a first state to a second state twice for each of the analog detector signals. A digital set of values could be simply a binary set that has, in this instance, a set of zeroes identifying the number of intervals from the reset command to the first change of state of the comparator output 453, followed by a set of ones identifying the number of intervals from the first to the second change of state of the comparator output 453, followed by a set of zeroes up so that the total length equals the maximum number of intervals, 185. In this example, there would be 46 zeroes followed by 108 ones followed by 31 zeroes. In a preferred variation of this example, two counters are included in the digital pixel sensor circuit 315, and two counter values are stored rather than a long string of bits. The first counter stores a count of the quantity of intervals at which the first change of state of the comparator output 453 occurs (in this example, 47), and the second counter stores a count of the quantity of intervals at which the second change of state of the comparator output 453 occurs (in this example, 155). Thus, a set of digital values that quantify the light intensity of one of the co-located light band detectors comprises two digital values that are stored in two counters. This preferred variation is called digital double sampling, and for the example described, digital double sampling substantially reduces the number of bits stored in comparison to the version in which a string of 185 bits are stored. By measuring two interceptions of the reverse voltage and a test voltage, the rate of decrease of the reverse voltage can be estimated more accurately, resulting in a more accurate determination of the light intensity.

It will be appreciated that for a particular choice of values of the reference voltages. $V_{test}$ B-LOW and $V_{test}$B-HIGH, light intensities (within a determinable range) will result in two matches of the output signal to the reference voltage. $V_{test}$ B-LOW and $V_{test}$B-HIGH can be chosen to optimize the accuracy of the light intensity estimation for those values of light intensity at which the estimate would otherwise be poorest by using only one reference voltage. It will be further appreciated that the two counters described above with reference to the digital double sampling could be alternatively included within an array memory of the single digital pixel sensor.

The example described above can be generalized for a first plurality of photosensors (that is not necessarily three), and for a second plurality of time intervals (that is not necessarily 185), and for a third plurality of test voltages for each photosensor (that is not necessarily two), as follows:

A multicolor light sensing pixel structure comprises a photodiode structure, a first multiplexing circuit, a second multiplexing circuit, and single digital pixel sensor. The photodiode structure comprises a first plurality of co-located light band detectors that generate a first plurality of analog detector signals. An amount of energy detected by each of the first plurality of co-located light band detectors since the photodiode structure has been reset by a reset command can be determined from the first plurality of analog detector signals. The first multiplexing circuit is coupled to the first plurality of analog detector signals of the photodiode structure, and sequentially generates each of the first plurality of analog detector signals at a first multiplexed output during each cycle. A cycle comprises a second plurality of time intervals that occur between two reset commands. A second multiplexing circuit is coupled to a first plurality of reference signals, and sequentially generates at a second multiplexed output each of the first plurality of reference signals in synchronism with the first multiplexed output. The single digital pixel sensor circuit has inputs coupled to the first and second multiplexed outputs, and sequentially generates for each cycle a series of digital outputs based on the first and second multiplexed outputs.

The single digital pixel sensor circuit comprises a comparator and a third plurality of digital counters. The series of digital outputs of the single digital pixel sensor circuit comprises interleaved sets of binary values generated by the comparator based on a comparison of the value of the first multiplexed output to second multiplexed output. Each interleaved set of binary values is a sequence of the binary values generated by the comparator during one cycle for one of the first plurality of co-located light band detectors. Each of the third plurality of counters generates a digital value that is a count of time intervals between a reset command and a change of state of the binary values in an interleaved set of binary values.

Other techniques for quantifying the energy detected between reset commands can be used with the flexible and very compact implementation of the photodiode structure of the present invention. For example, the two reference voltage levels used between two reset commands can be varied based on estimated light intensities measured between previous reset commands to further optimize the estimation of light intensity (at a cost of more computation).

It will be appreciated although much of the description above has been done with reference to three photodiodes that are sensitive to blue, green, and red bands of light, the present invention is beneficial for more color bands (e.g., four), or fewer (two), and with other spectral combinations, as may appropriate for a particular sensing equipment. It will be further appreciated that although some of the circuits described above have been described as being implemented in voltage mode logic, current mode logic could be alternatively used.

Multicolor image sensors that use the multicolor light sensing pixel structures described herein can be included in equipments such as robotic imagers and digital cameras. Such equipment comprises a plurality of the multicolor light sensing pixel structures described above, each pixel structure comprising in one embodiment a pixel memory for each pixel, and such equipment also comprises a control and processing circuit coupled to the plurality of multicolor light sensing pixel structures for controlling timing of the sequences of analog detector signals, reference values, and the single digital pixel sensor circuit, and for generating an image (or frame) file from the sets of digital outputs. In many of these equipments, the image files are then be transferred to another equipment.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A multicolor light sensing pixel structure comprising:
a photodiode structure comprising a first plurality of co-located light band detectors that generate a first plurality of analog detector signals from which an amount of energy detected by each of the first plurality of co-located light band detectors since the photodiode structure has been reset by a reset command can be determined;
a first multiplexing circuit coupled to the first plurality of analog detector signals of the photodiode structure, which sequentially generates each of the first plurality of analog detector signals at a first multiplexed output during each cycle comprising a second plurality of time intervals that occur between two reset commands;
a second multiplexing circuit coupled to a first plurality of reference signals, which sequentially generates at a second multiplexed output each of the first plurality of reference signals in synchronism with the first multiplexed output; and
a single digital pixel sensor circuit having inputs coupled to the first and second multiplexed outputs, which sequentially generates for each cycle a series of digital outputs based on the first and second multiplexed outputs.

2. The multicolor light sensing pixel structure according to claim 1 further comprising a control and processing circuit that generates a value of at least one of the first plurality of reference signals as an additive combination of at least one of an estimation of a current value of another one of the first plurality of analog detector signals, a test value, and a white balance adjustment value.

3. The multicolor light sensing pixel structure according to claim 1, wherein the estimation of the current value of the other of the first plurality of analog detector signals is a value determined from the first plurality of analog detector signals that occurred before the most recent reset command.

4. The multicolor light sensing pixel structure according to claim 1, wherein the series of digital outputs quantifies a total amount of energy detected by each of the first plurality of co-located light band detectors between two reset commands.

5. The multicolor light sensing pixel structure according to claim 1, wherein the single digital pixel sensor circuit further comprises a comparator, and wherein the series of digital outputs of the single digital pixel sensor circuit comprises sets of binary values generated by the comparator based on a comparison of the first multiplexed output to the second multiplexed output, each set of binary values quantifying a total amount of energy detected by one of the first plurality of co-located light band detectors between two reset commands.

6. The multicolor light sensing pixel structure according to claim 1, wherein the photodiode structure has a multi-well structure of light detectors, each of which detects multiple light bands and generates the first plurality of analog detector signals.

7. The multicolor light sensing pixel structure according to claim 1, wherein the series of digital outputs comprises sets of digital output values, each set of digital values quantifying the amount of energy detected by each of the first plurality of co-located light band detectors between two reset commands, and wherein the multicolor light sensing pixel structure comprises a pixel memory for storing one set of the digital output values generated by the single digital pixel sensor circuit for each of the first plurality of co-located light band detectors.

8. The multicolor light sensing pixel structure according to claim 1,
wherein the single digital pixel sensor circuit further comprises a comparator, and
wherein the series of digital outputs of the single digital pixel sensor circuit comprises interleaved sets of binary values generated by the comparator based on a comparison of the first multiplexed output to the second multiplexed output, and
wherein each interleaved set of binary values is a sequence of the binary values generated by the comparator during each cycle for one of the first plurality of co-located light band detectors, and
wherein the multicolor light sensing pixel structure further comprises a pixel memory for each of the first plurality of co-located light band detectors, each pixel memory storing a set of binary values that is de-interleaved from one of the interleaved set of binary values.

9. The multicolor light sensing pixel structure according to claim 1,
wherein the series of digital outputs of the single digital pixel sensor circuit comprises sets of digital values, each set of digital values comprising two digital values that quantify the amount of energy detected by each of the first plurality of co-located light band detectors between two reset commands, and
wherein the multicolor light sensing pixel structure further comprises, for each of the first plurality of co-located light band detectors, a pixel memory comprising two digital value memories for storing the two digital values generated by the single digital pixel sensor circuit for each of the first plurality of co-located light band detectors.

10. The multicolor light sensing pixel structure according to claim 9, wherein the single digital pixel sensor circuit further comprises:
a comparator; and
a third plurality of digital counters,
wherein the series of digital outputs of the single digital pixel sensor circuit comprises interleaved sets of binary values generated by the comparator based on a comparison of the first multiplexed output to the second multiplexed output, and
wherein each interleaved set of binary values is a sequence of the binary values generated by the comparator during one cycle for one of the first plurality of co-located light band detectors, and
wherein each of the third plurality of digital counters generates a digital value that is a count of time intervals between a reset command and a change of state of the binary values in an interleaved set of binary values.

11. An image sensor, comprising:
an array of multicolor light sensing pixel structures, each structure comprising
a photodiode structure comprising a first plurality of co-located light band detectors that generate a first plurality of analog detector signals from which an amount of energy detected by each of the first plurality of co-located light band detectors since the photodiode structure has been reset by a reset command can be determined;
a first multiplexing circuit coupled to the first plurality of analog detector signals of the photodiode structure, which sequentially generates each of the first plurality of analog detector signals at a first multiplexed output during each of a second plurality of time intervals that occur between two reset commands;
a second multiplexing circuit coupled to a first plurality of reference signals, which sequentially generates at a second multiplexed output each of the first plurality of reference signals in synchronism with the first multiplexed output; and
a single digital pixel sensor circuit having inputs coupled to the first and second multiplexed outputs, which sequentially generates a sets of digital outputs based on the first and second multiplexed outputs; and
an array memory coupled to each of the single digital pixel sensor circuits, wherein each of the sets of digital output values quantifies the amount of energy detected by one of the first plurality of co-located light band detectors between two reset commands, and wherein the array memory stores at least one digital output value generated by the single digital pixel sensor circuit for each of the light band detectors.

12. An image equipment, comprising:
an array of multicolor light sensing pixel structures, each structure comprising
a photodiode structure comprising a first plurality of co-located light band detectors that generate a first plurality of analog detector signals from which an amount of energy detected by each of the first plurality of co-located light band detectors since the photodiode structure has been reset by a reset command can be determined;
a first multiplexing circuit coupled to the first plurality of analog detector signals of the photodiode structure, which sequentially generates each of the first plurality of analog detector signals at a first multiplexed output during each of a second plurality of time intervals that occur between two reset commands;
a second multiplexing circuit coupled to a first plurality of reference signals, which sequentially generates at a second multiplexed output each of the first plurality of reference signals in synchronism with the first multiplexed output; and a single digital pixel sensor circuit having inputs coupled to the first and second multiplexed outputs, which sequentially generates sets of digital outputs based on the first and second multiplexed outputs; and an array memory coupled to each of the single digital pixel sensor circuits, wherein each set of digital output values quantifies the amount of energy detected by one of the plurality of co-located light band detectors between two reset commands, and wherein the array memory stores one set of digital output values generated by the digital pixel sensor circuit for each of the light band detectors; and a control and processing circuit coupled to the array of multicolor light sensing pixel structures and to the array memory for controlling timing of the first and second multiplexers and the single digital pixel sensor circuits; for controlling storage of the sets of digital outputs in the array memory, and for generating an image file from data in the array memory.

13. An image equipment comprising:

a plurality of multicolor light sensing pixel structures, each comprising a photodiode structure comprising a first plurality of co-located light band detectors that generate a first plurality of analog detector signals from which an amount of energy detected by each of the first plurality of co-located light band detectors since the photodiode structure has been reset by a reset command can be determined;

a first multiplexing circuit coupled to the first plurality of analog detector signals of the photodiode structure, which sequentially generates each of the first plurality of analog detector signals at a first multiplexed output during each of a second plurality of time intervals that occur between two reset commands;

a second multiplexing circuit coupled to a first plurality of reference signals, which sequentially generates at a second multiplexed output each of the first plurality of reference signals in synchronism with the first multiplexed output; and a single digital pixel sensor circuit having inputs coupled to the first and second multiplexed outputs, which sequentially generates sets of digital outputs based on the first and second multiplexed outputs, each set quantifying the amount of energy detected by each of the first plurality of co-located light band detectors between two reset commands, wherein the single digital pixel sensor circuit comprises a pixel memory for storing one set of the digital output values generated by the digital pixel sensor circuit for each of the first plurality of co-located light band detectors; and a control and processing circuit coupled to the plurality of multicolor light sensing pixel structures for controlling timing of the sequences of analog detector signals, reference values, and the single digital pixel sensor circuit, and for generating an image file from the sets of digital outputs.

* * * * *